United States Patent [19]

Hyman

[11] 4,294,466
[45] Oct. 13, 1981

[54] WEIGHT REDISTRIBUTION APPARATUS

[75] Inventor: Dennis C. Hyman, Olympia, Wash.

[73] Assignee: Molly Presley, Olympia, Wash.

[21] Appl. No.: 81,858

[22] Filed: Oct. 4, 1979

[51] Int. Cl.³ .............................................. B62D 9/02
[52] U.S. Cl. ................................ 280/772; 280/112 A
[58] Field of Search ................. 280/772, 112 R, 112 A

[56] References Cited

U.S. PATENT DOCUMENTS

| | | | |
|---|---|---|---|
| 2,260,102 | 10/1941 | Freret | 280/772 X |
| 2,811,370 | 10/1957 | Gramatzki | 280/112 R |
| 2,859,976 | 11/1958 | McFarland | 280/104 |
| 2,978,255 | 4/1961 | Rosenkrands | 280/112 A |
| 3,008,729 | 11/1961 | Muller et al. | 280/112 A |
| 3,300,232 | 1/1967 | Van Winsen et al. | 280/112 R |
| 3,485,506 | 12/1969 | Melbar | 280/87 |
| 3,704,027 | 11/1972 | Laudadio | 280/112 A X |
| 3,704,897 | 12/1972 | Bagge et al. | 280/91 |
| 3,820,809 | 6/1974 | Blonar | 280/772 X |
| 4,159,128 | 6/1979 | Blaine | 280/772 |

FOREIGN PATENT DOCUMENTS 232488 3/1911 Fed. Rep. of Germany ...... 280/772

*Primary Examiner*—Joseph F. Peters, Jr.
*Assistant Examiner*—Norman L. Stack, Jr.

*Attorney, Agent, or Firm*—Christensen, O'Connor, Johnson & Kindness

[57] ABSTRACT

Method and apparatus for redistributing the weight of a vehicle over its front wheels while it negotiates a turn, thereby increasing its turning capability relative to the vehicle the wheel on the inside of the turn and raises the front wheel on the outside of the turn. Specifically, two telescoping members are provided, one which moves axially within the other. One of the telescoping members is attached to the vehicle frame while the other is attached to the front axle of the vehicle. A helical keyway on one of the telescoping members engages a key affixed to the other of the members. As the two members telescope, the member attached to the front axle of the vehicle rotates a small amount, thus raising the outside front wheel and lowering the inside front wheel. The element coupled to the front axle is biased in a forward direction by a resiliently collapsible member such as a shock absorber. As the vehicle enters the turn, the turning forces acting on the front wheels cause the telescoping member to move against the biasing force and thus rotate the front axle to provide the relative elevation differential between the two front wheels. The biasing force is chosen such that the amount of rotation of the telescoping member is generally proportional to the magnitude of the turning force.

9 Claims, 3 Drawing Figures

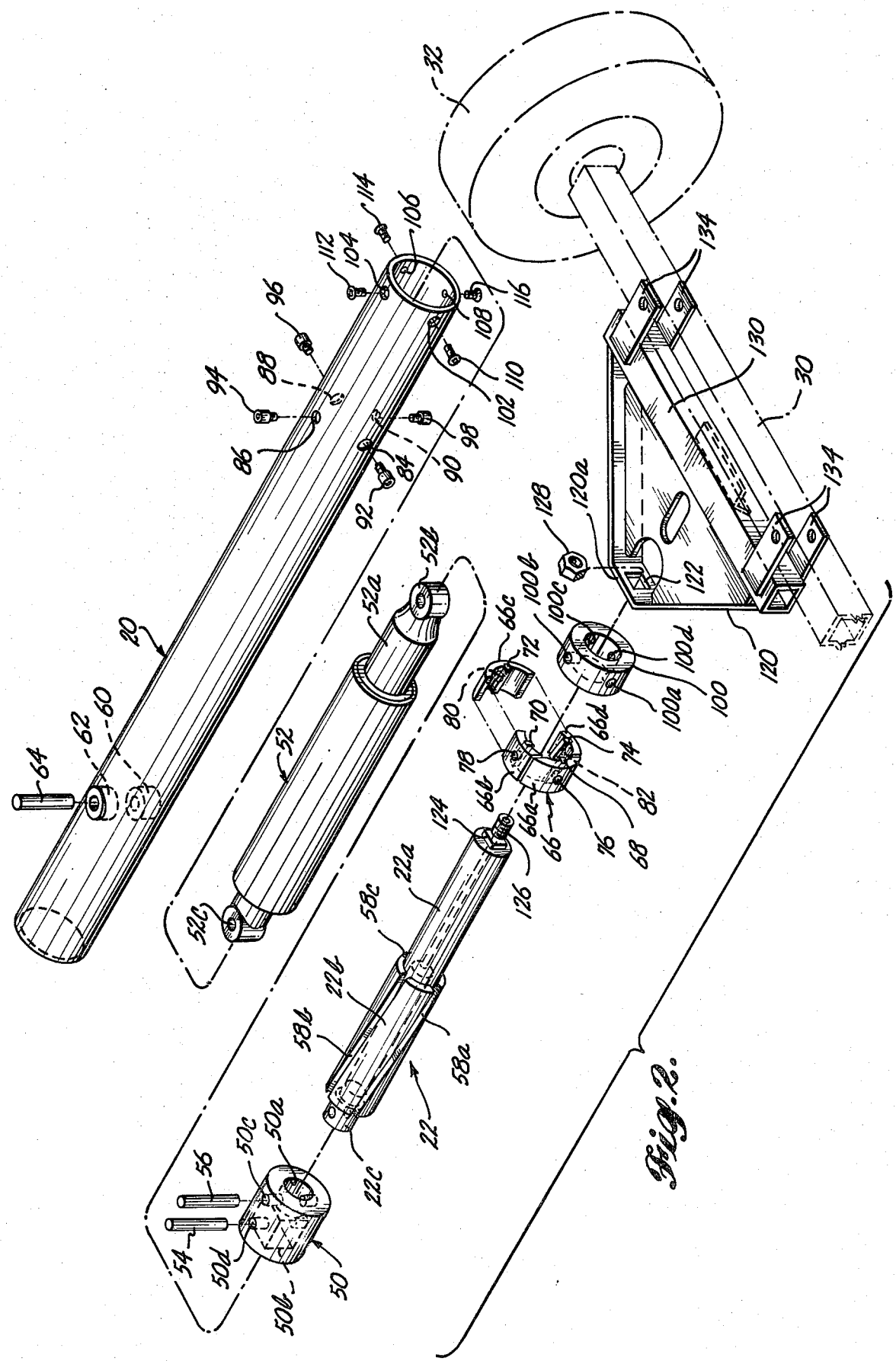

WEIGHT REDISTRIBUTION APPARATUS

BACKGROUND OF THE INVENTION

The present invention relates to a method and apparatus for redistributing the weight of a vehicle over its front wheels as it negotiates a turn, and more particularly to a method and apparatus for substantially equalizing weight distribution on the front wheels of a vehicle, especially, the front wheels of a racing vehicle, as it negotiates a turn.

Many racing vehicles, especially those of the quarter midget class customarily race on an oval track in a counterclockwise direction. Thus they are continuously turning to the left under race conditions and are not called upon to turn to the right. As such a vehicle enters and negotiates a turn, centrifugal and other turning forces acting upon the vehicle and especially upon the front wheels of the vehicle twist the frame and suspension system, causing more of the weight of the vehicle to be concentrated on the right front wheel than remains on the left front wheel. When the vehicle is traveling at a high rate of speed, the frame and suspension system often distort to such an extent that the left front tire, that is, the inside tire in a left hand turn is lifted completely off the track. When the weight of the vehicle resides mostly on the outside wheel and little or none resides on the inside wheel, a loss of turning traction is experienced. The consequent reduction in traction requires the driver of the racing vehicle to slow down while negotiating the turn, thus wasting valuable race time.

It is therefore a broad object of the present invention to provide methods and apparatus for increasing and maximizing the traction on the front wheels of a vehicle while it is negotiating a turn. It is a further object of the present invention to provide methods and apparatus for maintaining both front tires on the ground while a vehicle negotiates a turn at a high rate of speed. It is a further object of the present invention to evenly distribute the weight of the vehicle over the front wheels so as to maximize the available turning capability as the vehicle negotiates a turn.

SUMMARY OF THE INVENTION

The foregoing objects, and other objects that will become apparent to one of ordinary skill upon reading the following specification, are broadly provided in a method for redistributing the weight of a vehicle over its front wheels as the vehicle negotiates a turn. The method comprises the step of providing an elevation differential relative to the vehicle between the front wheels of the vehicle so that, preferably, the wheel on the inside of the turn is lower than the wheel on the outside of the turn. The relative elevation differential is created in reaction to the turning forces exerted on the front wheels as the vehicle negotiates the turn. Most preferably the elevation differential is increased proportionally to the turning forces. The present invention also provides an apparatus for carrying out the foregoing method. The apparatus of the present invention provides a pair of relatively telescoping elements. The first of the elements is affixed to the frame of a vehicle while the second element is affixed to the front wheels of the vehicle, thereby mounting the front wheels for fore and aft movement relative to the vehicle frame. A means is associated with the first and second elements for axially rotating the second element in a predetermined direction relative to the first element as the elements telescope. Thus, when the elements telescope, a relative elevational difference is provided between the front wheels. A biasing means operatively couples the two telescoping elements to bias the second element in a forward direction. The biasing means is resiliently collapsible in reaction to exertion of turning force on the front wheels. The relative elevational difference in the front wheels is thereby effected in reaction to the turning force.

BRIEF DESCRIPTION OF THE DRAWINGS

A better understanding of the present invention can be derived by reading the ensuing specification in conjunction with the accompanying drawings wherein:

FIG. 2 is an exploded isometric view of the weight redistribution apparatus of the present invention.

DETAILED DESCRIPTION OF THE INVENTION

Figure 1:
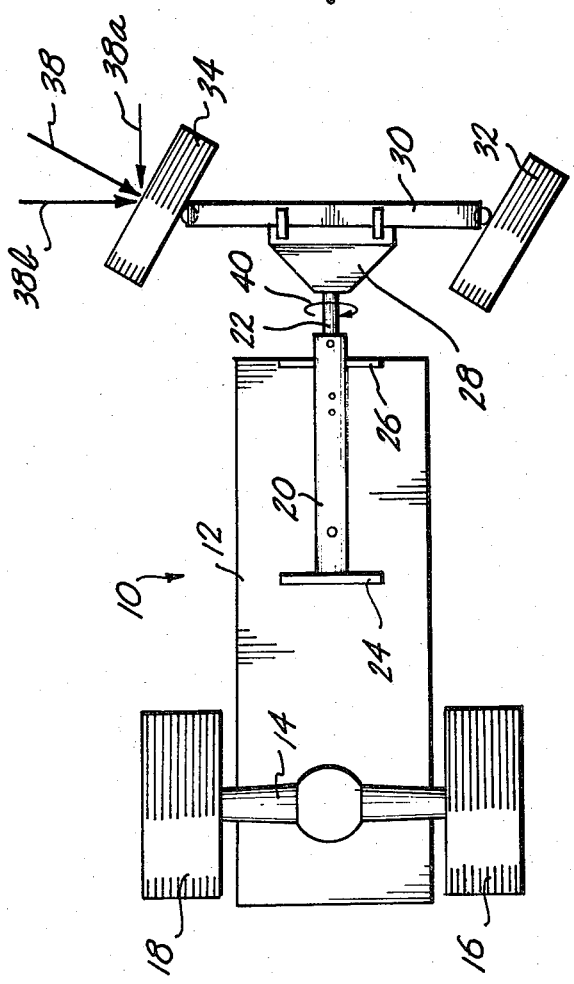
FIG. 1 is a bottom view of a vehicle employing the weight redistribution apparatus of the present invention.

Referring first to FIG. 1, a vehicle 10 upon which the weight redistribution apparatus of the present invention is employed includes a frame 12, rear axle 14, and rear wheels 16 and 18. In general, the weight redistribution apparatus comprises a mounting tube 20 and a torque rod 22. As will be explained in greater detail below, the torque rod 22 is mounted for telescoping movement in the mounting tube 20. The rear and forward ends of the mounting tube 20 are respectively affixed to flanges 24 and 26 that extend downwardly from the frame 12. The forward end of the torque rod 22 is affixed to a front axle coupling assembly 28. A solid front axle 30 is in turn affixed to the axle coupling assembly 28. Steerable front wheels 32 and 34 are mounted in a conventional manner on the ends of the solid front axle.

In operation, as the vehicle is entering for example, a left-hand turn on an oval track, centrifugal force tends to move the vehicle outwardly or in a tangential direction relative to the curve on the track. The tendency toward tangential movement is counteracted by the resistive force created as a result of the traction between the front wheels 32 and 34 and the ground. This resistive force, schematically indicated by arrow 38, can be divided into two components, a rearward component 38a exerted in a rearward direction on the front wheels 32 and 34 and thus on the front axle assembly and a lateral force 38b exerted laterally on the front axle assembly. As described above, the turning forces tend to cause the inside, or left, front wheel 32 to lift from the ground. The present invention compensates for this lifting effect on the inside front wheel 32 by rotating the axle coupling assembly in the solid front axle in a counterclockwise direction (looking forwardly) as indicated by arrow 40. As the solid front axle is slightly rotated in a counterclockwise direction, an elevation difference relative to the frame 12 is created between the inside front wheel 32 and the outside, or right, front wheel 34. This relative elevation difference not only causes both front wheels to be in contact with the track but more importantly is chosen so that both front wheels are evenly weighted, thus providing the greatest traction possible for the front wheels in the turn. As will be explained in much more detail below, the rotation of the solid front axle is accomplished by a helical shoe assembly mounted within the mounting tube 20 and coupled to the torque rod 22. As the rearward force 38a is exerted on the front axle assembly, it causes the torque rod 22 to telescope within the mounting tube 20. As this occurs, the helical shoe assembly causes the torque rod to rotate in a counterclockwise direction and thus effect the relative elevation difference between the inside front wheel 32 and the outside front wheel 34.

Figure 3:
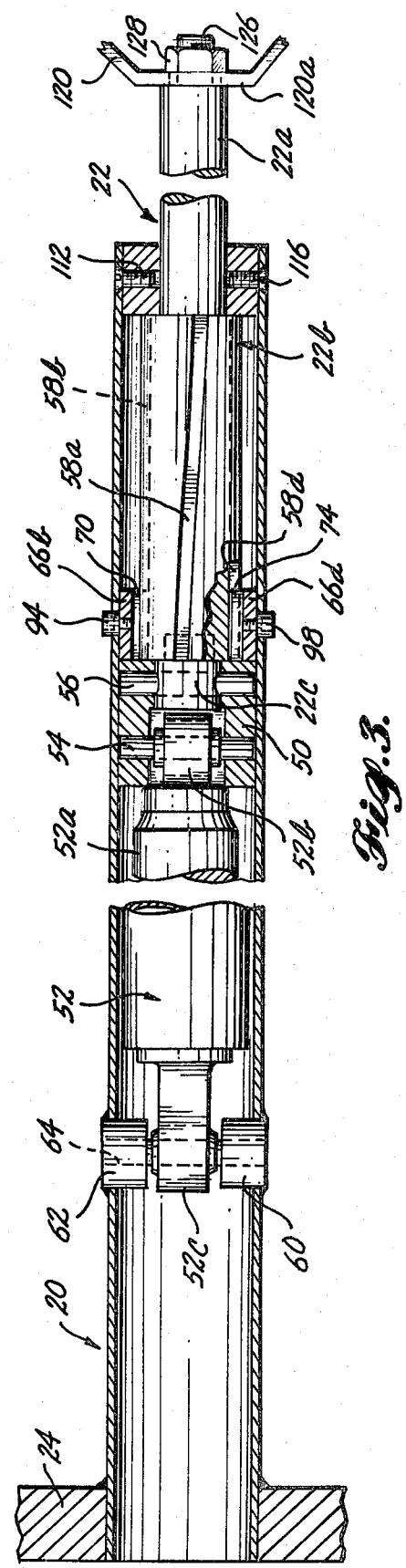
FIG. 3 is a segmented longitudinal sectional view of the assembled weight redistribution apparatus.

Referring now to FIGS. 2 and 3, the weight redistribution apparatus of the present invention will be described in detail by reference to the exploded isometric view of FIG. 2 in conjunction with assembly instructions. A cylindrical coupling sleeve 50 has an axial bore 50a in one end thereof and an enlarged rectangular recess 50b in the axially opposite end thereof. Two parallel diametric bores 50c and 50d respectively intersect the circular bore 50a and the rectangular recess 50b. The diametric bore 50d is oriented perpendicularly to and centered on two of the faces of the rectangular recess 50b. The outside diameter of the coupler is sized to provide a sliding fit inside the mounting tube 20. The coupler joins the torque rod 22 and a combined damper and compression spring assembly 52. The combined damper and the compression spring can be a conventional telescoping, adjustable, automotive shock absorber and will hereinafter be referred to as such. The inner telescoping member 52a of the shock absorber has a conventional sleeve-type coupler 52b thereon. The bore in the coupler 52b is the same diameter as the diametric bore 50d in the coupling sleeve 50. The coupler 52b is inserted into the rectangular recess 50b and a coupling pin 54 is inserted through the coupler 52b and the bore in the coupling sleeve 50 to secure the inner telescoping portion 52a of the shock absorber 52 to the coupling sleeve 50.

The torque rod 22 comprises a forward, reduced diameter portion 22a and a rearward, enlarged diameter portion 22b, as well as a stub extension 22c extending rearwardly from the enlarged diameter portion 22b. The outside diameter of the stub extension 22c is sized to mate with the axial bore 50a in the coupling sleeve 50. A diametric bore is provided in the stub extension 22c to receive a second locking pin 56 that is inserted through the diametric bore 50c in the coupling sleeve 50 and the diametric bore in the stub extension 22c to thus secure the torque rod to the coupling sleeve and thus to the shock absorber 52. The enlarged diameter portion 22b of the torque rod 22 carries four helical grooves or keyways 58a, 58b, 58c, and 58d all of which cannot be readily seen in FIG. 2. The helical grooves 58 traverse a relatively shallow helix and are spaced 90° apart around the circumference of the increased diameter portion 22b of the torque rod 22. In the preferred embodiment the helical grooves rotate through an arc of 18° as they extend around the increased diameter portion through an axial distance of 5 inches.

A pair of spaced sleeves 60 and 62 are mounted in a diametric bore near the rearward end of the mounting tube 20. The sleeves 60 and 62 carry mutually aligned bores for receiving a locking pin 64. The sleeves 60 and 62 are spaced sufficiently far apart to receive the conventional coupler 52c extending rearwardly from the main body of the shock absorber 52. When the shock absorber 52, the coupling sleeve 50, and the torque rod 22 are assembled, they are inserted into the front end of the mounting tube and moved rearwardly until the bore in the rearwardly extending coupler 52c is aligned with the bores in the sleeves 60 and 62. The locking pin 64 is then inserted through the mutually aligned bores to affix the shock absorber 52 to the mounting tube 20. Next, the helix shoe 66 is inserted into the mounting tube. The helix shoe is generally annularly shaped. The shoe is divided into four segments in this embodiment. The segments are formed by two parallel saw cuts along chords of the annulus spaced on each side of a diameter of the annulus. Each of the segments 66a, 66b, 66c, and 66d carries a keyway on its inner surface that has a helical angle relative to its axis that is equal to the helical angle of the keyways 58a, 58b, 58c, and 58d in the enlarged diameter portion 22b of the torque rod 22. Again, the keyways on the inner surface of the segments 66a through 66d are oriented 90° from each other. Keys 68, 70, 72, and 74 are respectively affixed in a conventional manner, as by soldering or welding to the keyways in the shoe segments 66a, 66b, 66c, and 66d. Additionally, each of the segments carries respective radial bores 76, 78, 80, and 82 that are internally threaded. The radial bores extend from the outer surface of the helix shoe 66 to its inner surface and intersect the respective keyways. To assemble the apparatus, the helix shoe is inserted onto the enlarged diameter portion of the torque rod 22 as the latter is being inserted into the mounting tube 20. When the torque rod is inserted as far as it is to go and the rearward end of the shock absorber is pinned to the torque tube, the helix shoe assembly is then urged down the enlarged portion of the torque rod until it resides adjacent the rearward end of the helical keyways 58a, 58b, 58c, and 58d. Four radial apertures 84, 86, 88, and 90 are provided in the circumference of the mounting tube 20 to align with the threaded bores 76, 78, 80, and 82 in the helix shoe segments 66a through 66d when the shoe is positioned adjacent the rearward end of the helical keyways on the torque rod. Set screws 92, 94, 96, and 98 are then inserted respectively through the apertures 84, 86, 88, and 90 in the mounting tube and threaded into the internally threaded bores 76, 78, 80, and 82 in the helix shoe 66 to lock it in place.

Thereafter, the front bushing 100 is inserted over the forward end 22a of the torque rod 22 and positioned inside the forward end of the mounting tube 20. The front bushing has an internal diameter slightly larger than that of the forward reduced diameter portion 22a of the torque rod 22 while its outer diameter is slightly less than the inner diameter of the mounting tube 20. The front bushing is provided with four internally threaded radial bores 100a, 100b, 100c, and 100d. Four radial apertures 102, 104, 106, and 108 are provided at the forward end of the mounting tube. These apertures 102 through 108 align with the bores 100a, b, c, and d when the front bushing is in its assembled position in the forward end of the mounting tube 20. Bolts 110, 112, 114, and 116 are then inserted through the apertures 102 through 108 and engage the internally threaded bores 100a through 100d to secure the front bushing 100 in place.

The axle coupling assembly 28 comprises a rearwardly extending, generally V-shaped flange 120 having a rearwardly facing, vertically oriented flat portion 120a at its apex. The flat portion has a square opening 122 that faces rearwardly toward the forward end of the torque rod 22. A square boss 124 on the forward end of the torque rod 22 mates with the square opening 122 and the rearward portion 120a of the V-shaped flange 120. A stub shaft 126 extending forwardly from the square boss receives nut 128, which when threaded tightly onto the stub shaft 126 secures the torque rod 22 to the axle coupling assembly 28. The forward end of the V-shaped flange is coupled to a box 130 which abuts the front axle 30. Forwardly extending flanges 134 carry mutually aligned bores which mate with aligned bores (not shown) in the front axle 30 to secure the axle coupling assembly 28 to the axle.

Referring now to FIG. 3, the turning forces acting on the front axle and coupling assembly overcome the biasing force of the shock absorber 52 and move the torque rod 22 rearwardly in the direction of arrow 138. As the torque rod 22 moves rearwardly, the coaction of the helical keyway in the enlarged portion of the torque rod and the stationary helix shoe assembly 66, cause the torque rod to rotate in a counterclockwise direction (when looking in a forward direction). Depending upon the overall weight of the vehicle, and the desired speeds and turning forces encountered during race conditions, it may be desirable to vary the forward biasing force achievable by the shock absorber 52. It is therefore preferred to employ an adjustable shock absorber on which both the forward biasing force and the dampening action can be adjusted. For example, if higher speeds are required, thus causing the vehicle to encounter larger turning forces, a larger biasing force may be required in order to maintain the proper elevation differential between the front wheels when the vehicle is cornering. Additionally, since the turning forces acting upon the front wheels of the vehicle will vary even over a short span of time, the dampening characteristics of the shock absorber can be adjusted to best accommodate such variations so that undesirable oscillations in the assembly will be eliminated.

The present invention has been described in conjunction with the best mode of carrying out the invention known at this time. One of ordinary skill after reading the foregoing specification will be able to effect various changes, substitution of equivalents and other alterations without departing from the broad concepts disclosed herein. For example, one of ordinary skill will be able to alter the assembly so that it will provide a proper elevation differential between the front wheels of a vehicle when entering a right turn instead of a left turn. Additionally, the apparatus of the present invention can be altered so that proper elevation differential will be automatically provided whether the vehicle is entering a left-hand turn or a right-hand turn. The apparatus can also be altered so as to provide clockwise rotation of the front axle assembly when negotiating a left-hand turn should this mode of operation be desirable. It is thus intended that the protection granted by Letters Patent hereon be limited only by the definition contained in the apended claims and equivalents thereof.

The embodiments of the invention in which an exclusive property or privilege is being claimed are defined as follows:

1. An apparatus for redistributing the weight of a vehicle as said vehicle negotiates a turn, said vehicle including a frame, two front wheels, and two rear wheels, comprising:
   a pair of relatively telescoping elements, a first of said elements being affixed to said frame, the second of said elements being operatively coupled to said two front wheels to mount said front wheels for fore and aft longitudinal movement relative to said frame,
   means associated with said elements for axially rotating said second element in a predetermined direction relative to said first element as said elements telescope, said second element being operatively coupled to said front wheels to alter the relative elevation of said wheels as said second element rotates relative to said first element,
   biasing means operatively coupled between said telescoping elements to bias the telescoping movement of said second element in a forward direction, said biasing means being resiliently collapsible in reaction to exertion of a turning force on said front wheels to allow said second element to telescope relative to said first element, to thereby effect an elevation differential in said front wheels relative to said frame in reaction to said turning force.

2. The apparatus of claim 1 wherein said biasing means includes means for dampening the telescoping movement to substantially eliminate undesirable oscillations in said fore and aft telescoping movement of said second element relative to said first element.

3. The apparatus of claim 2 wherein said biasing means comprises an adjustable automotive shock absorber.

4. The apparatus of claim 1 wherein said front wheels are mounted on a solid front axle, said solid axle being affixed to said second element to thereby rotate said solid axle as said second element rotates.

5. An apparatus for redistributing the weight of a vehicle as it negotiates a turn comprising:
   a first element capable of being affixed to a vehicle frame and a second element capable of being affixed to the front axle of said vehicle, said front axle carrying a pair of wheels, said second element having an axis that is oriented longitudinally relative to said vehicle when said front axle is associated with said vehicle,
   first means mounting said second element to said first element for axial movement along said axis relative to said first element between at least a forward position and an aft position, thereby allowing said front axle to move fore and aft relative to said vehicle,
   second means further mounting said second element for rotation about said axis in reaction to said fore and aft axial movement of said second element, thereby causing a relative elevational differential between the wheels on said front axle as said axle moves fore and aft,
   third means associated with said first and second elements for generating a biasing force to bias said second element toward said forward position, said wheels being level relative to said vehicle when in said forward position, the relative elevation differential between said wheels being effected when said front axle is moved aft in reaction to a force exerted on said wheels and said front axle in opposition to the biasing force generated by said third means.

6. An apparatus for redistributing the weight of a vehicle as it negotiates a turn comprising:
   a first element capable of being affixed to a vehicle frame and a second element capable of being affixed to the front axle of said vehicle to thereby mount said front axle on said vehicle frame, said second element having an axis that is oriented longitudinally relative to said vehicle when said second element is affixed to said front axle, one of said first and second elements being tubular and the other of said first and second elements being a torque rod, said torque rod being mounted for telescoping axial movement relative in said tubular member, first means mounting said second element for rotation about said axis in reaction to said axial movement, and second means associated with said first and second elements for biasing said second element in a forward direction.

7. The apparatus of claim 6 wherein said first means comprises a first member having a helical keyway thereon and mounted on one of said tubular member and said torque rod, and a key affixed to the other of said tubular member and said torque rod, said key and said keyway cooperating to rotate said torque rod as it moves axially relative to said tubular member.

8. The apparatus of claim 7 wherein said second means comprises a conventional adjustable automotive shock absorber.

9. An apparatus for redistributing the weight of a vehicle as said vehicle negotiates a turn, said vehicle including a frame, two front wheels, and two rear wheels, comprising:

a pair of relatively telescoping elements, a first of said elements being affixed to said frame, the second of said elements being operatively coupled to said two front wheels to mount said front wheels for fore and aft longitudinal movement relative to said frame, said first element being a tubular member affixed to said frame, said second element being mounted for telescoping movement within said first element, means associated with said elements for axially rotating said second element in a predetermined direction relative to said first element as said elements telescope, said second element being operatively coupled to said front wheels to alter the relative elevation of said wheels as said second element rotates relative to said first element, said means for rotating said second element relative to said first element comprising a first member having a helical keyway thereon mounted on one of said first and second elements, and a key affixed to the other of said first and second elements, said key and said helical keyway being so constructed and arranged relative to each other and cooperating to rotate said second element as it telescopes within said first element, biasing means operatively coupled between said telescoping elements to bias the telescoping movement of said second element in a forward direction, said biasing means being resiliently collapsible in reaction to exertion of a turning force on said front wheels to allow said second element to telescope relative to said first element, to thereby effect an elevation differential in said front wheels relative to said frame in reaction to said turning force.

* * * * *